US007013280B2

(12) United States Patent
Davis et al.

(10) Patent No.: US 7,013,280 B2
(45) Date of Patent: Mar. 14, 2006

(54) DISAMBIGUATION METHOD AND SYSTEM FOR A VOICE ACTIVATED DIRECTORY ASSISTANCE SYSTEM

(75) Inventors: Brent L. Davis, Deerfield Beach, FL (US); Reza Ghasemi, Pompano Beach, FL (US); Susan M. Hill, Boynton Beach, FL (US); Tracy Kong, Coral Springs, FL (US); John r Lauria, Wellington, FL (US); Vanessa V. Michelini, Coconut Creek, FL (US)

(73) Assignee: International Business Machines Corporation, Armonk, NY (US)

( * ) Notice: Subject to any disclaimer, the term of this patent is extended or adjusted under 35 U.S.C. 154(b) by 746 days.

(21) Appl. No.: 09/794,413

(22) Filed: Feb. 27, 2001

(65) Prior Publication Data

US 2002/0120452 A1 Aug. 29, 2002

(51) Int. Cl.
*G10L 21/00* (2006.01)
(52) U.S. Cl. .................. 704/270; 704/270.1; 704/275; 707/10; 707/4
(58) Field of Classification Search ................ 704/246, 704/251, 231, 275, 9, 270, 270.1; 706/20; 379/354, 213.01, 357.05, 88.03, 67.1; 700/90; 707/10, 4, 6
See application file for complete search history.

(56) References Cited

U.S. PATENT DOCUMENTS

| 5,204,894 | A  | * | 4/1993  | Darden ..................... 379/88.03 |
| 6,173,279 | B1 | * | 1/2001  | Levin et al. ................... 707/5 |
| 6,421,672 | B1 | * | 7/2002  | McAllister et al. ........... 707/10 |
| 6,502,075 | B1 | * | 12/2002 | Terry et al. ................. 704/275 |
| 6,603,838 | B1 | * | 8/2003  | Brown et al. ............ 379/88.22 |
| 6,628,758 | B1 | * | 9/2003  | Fejes ........................ 379/67.1 |

* cited by examiner

*Primary Examiner*—W. R. Young
*Assistant Examiner*—Huyen X. Vo
(74) *Attorney, Agent, or Firm*—Akerman Senterfitt

(57) ABSTRACT

A method for correcting ambiguations in directory assistance systems includes the steps of receiving and processing a directory assistance request from a caller. If the processing results in an ambiguation of at least two names, audio information is provided to the caller. The audio information includes, at least in part, playback of an audio recording of at least one person included in the ambiguation. The audio playback helps the caller resolve the ambiguation. A voice activated directory assistance system having structure for resolving ambiguations is also disclosed.

21 Claims, 2 Drawing Sheets

DISAMBIGUATION METHOD AND SYSTEM FOR A VOICE ACTIVATED DIRECTORY ASSISTANCE SYSTEM

BACKGROUND OF THE INVENTION

1. Technical Field

This invention relates generally to voice activated directory assistance systems, and more particularly to disambiguation methodology for voice activated directory assistance systems.

2. Description of the Related Art

Voice activated directory assistance systems provide for directory assistance by requiring the caller to speak the name of the person who is being called. The voice activated directory assistance (VADA) system sometimes cannot discriminate between two or more names in the list of names due to ambiguations between names in the directory. Ambiguations can be the result of more than one person having the same or a closely similar name. Phonetic similarity is all that is necessary for an ambiguation to occur, which will prevent the VADA system from assigning an appropriate name to the request of a caller. Ambiguations can also be due in part to misrecognitions of the speech recognition system, which forms part of the VADA system.

VADA systems resolve ambiguations by different methods. The VADA system can present a list of the names included in the ambiguation to the caller, and ask the caller to choose between the names based upon a criteria. This criteria can be any suitable criteria such as the department, telephone number, or job description of the named person. For example, the following employees are in the company XYZ directory:

Tracy Kong, Department A
John Smith, Department A
John Smith, Department B
Brent Davis, Department B
Brent L. Davis, Department B When the caller asks for "John Smith," and an ambiguation scenario results due to the presence of two persons under the same name in the company directory. A solution to this problem has been to identify each name in the ambiguation and provide disambiguation information to assist the caller in selecting the correct person. A script might be as follows:

Welcome to XYZ Company Directory Assistance. Who do you wish to call?
"John Smith."
There are two John Smiths in Company XYZ. Press one to call John Smith from Department A or two to call John Smith from Department B.

The advantage of this solution is that the disambiguation criteria can be a mandatory field, so that all employees will have this field in their database entry. The disadvantages of this solution are that the caller may not know if John Smith works for Department A or B. Also, the disambiguation field could be the same for all persons found. The disambiguation field for Brent Davis and Brent L. Davis would, for example, both be Department B.

SUMMARY OF THE INVENTION

A method for correcting ambiguations in directory assistance systems comprises the steps of receiving and processing a directory assistance request from a caller, where the request results in an ambiguation of at least two names. Disambiguation information is audibly provided to the caller. The presentation includes at least in part the playback of an audio recording of at least one person included in the ambiguation. The voice of the person included in the ambiguation helps the caller to resolve the ambiguation, such that a selection of a name is received from the caller to correct the ambiguation. The playback can include an audio recording of the person stating their name. In another aspect, a message from the person named can be provided, and this message can include the name of the person.

The directory assistance system is preferably a voice activated directory assistance system. It is possible, however, to utilize the invention in a directory assistance system which is not voice activated, such as a key-in directory assistance system. The use of audio playback by persons included in an ambiguation will help to resolve the ambiguation in such systems. The disambiguation information can further include additional information for resolving an ambiguation. Such additional information can include at least one of department information, location information, job description information, and personal information.

A directory assistance system according to the invention includes a searchable directory for storing directory information; a database of audio recordings, each audio recording corresponding to an entry in the searchable directory; a query system for searching the directory for a particular entry based on received directory assistance requests; and, a disambiguation system for retrieving and playing back selected ones of the audio recordings in the database responsive to the query system locating multiple entries during a directory search. The directory assistance can further include a speech recognition system for converting spoken queries into computer-processable queries for use by the query system. As such, in one aspect of the invention, the directory assistance system can be a voice activated directory assistance system.

Notably, each audio recording can include a person stating their name. Alternatively, the audio recordings can include voice messages. The database of audio recordings also can include additional information for selecting between names in an ambiguation. The additional information can include at least one of department information, location information, job description information, and personal information. Finally, the directory assistance system can include structure for connecting a caller of the directory assistance system to a telephone associated with a located entry in the searchable directory.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION

Figure 1:
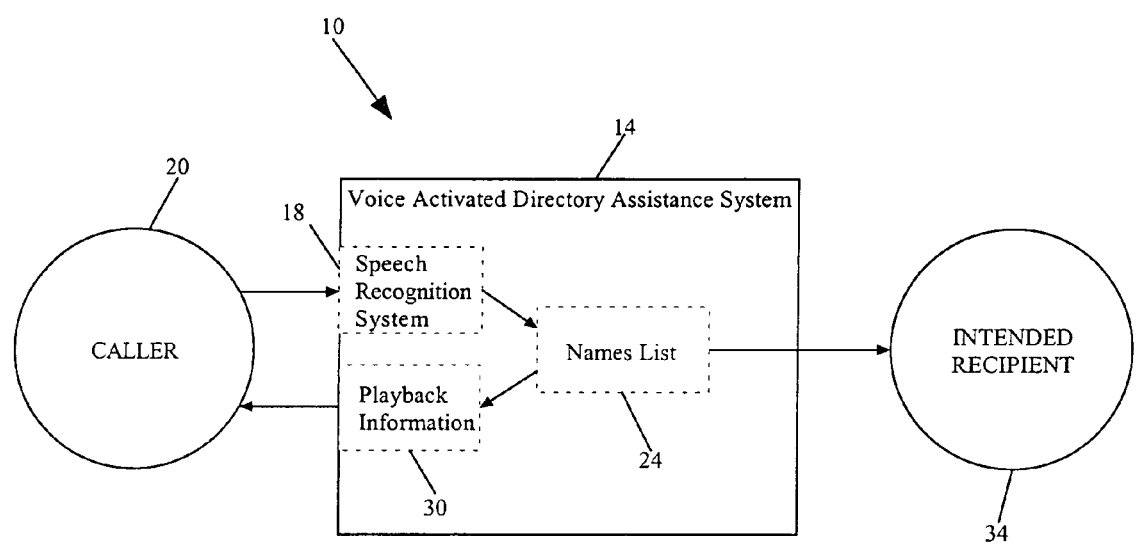
FIG. 1 is a schematic diagram of a system for resolving ambiguations in a voice activated directory assistance system.

A system for resolving ambiguations in voice activated directory assistance (VADA) systems is shown in FIG. 1. The system 10 includes a VADA system 14. The VADA system can be of any suitable design. The VADA system 14 will typically have a speech recognition system 18 by which voice selections of a caller 20 can be conventionally converted from speech to text. The system of the invention 10 also can include a names list 24. The names list 24 can be a directory of names and associated information which can be stored in suitable searchable memory such as random access memory (RAM). The system 10 of the invention also can include a memory having audio information 30. Audio information can include spoken recordings associated with particular names in the names list 24. Alternatively, the audio information 30 can be computer-generated audio associated with particular names in the names list 24. In any case, the memory comprising the audio information 30 can be a separate, dedicated memory, or can be the same memory in which the names list 24 is stored.

In operation, a caller 20 can speak the name of a person and the speech recognition system 18 can translate this speech into text using speech recognition system 18. The name spoken by the caller 20 is then processed further by the VADA 14. More particularly, the name spoken by the caller 20 can be searched in the names list 24. Notably, ambiguations occur when the VADA system 14 locates one or more names in the names list 24 in response to the request of the caller 20. This can be the result of multiple names appearing in the names list 24, the phonetic similarity of names in the names list 24, or misrecognition by the speech recognition system 18. To assist in disambiguating the spoken name, audio information 30 comprising an audio recording of each person located in the names list 24 can be played back for the caller 20. The caller 20, upon hearing the voice of a person included during the disambiguation process, can correctly identify the intended person which corresponds to the spoken name. The caller then can select the appropriate name, and is provided with a connection 34 to the selected person.

In one aspect of the present invention, the audio information 30 associated with a particular name in the names list 24 can include a recording of a person associated with the particular name stating the particular name. The audio information 30 also can include the person stating a message. The audio information 30 in another aspect of the present invention, can include additional information for assisting the caller in resolving the ambiguation. This additional information can include at least one of department information, location information, job description information, and present information about each person included in the ambiguation. Other information for identifying the named person could also be provided.

The invention has been illustrated with respect to a voice activated directory assistance system. In another aspect of the invention, however, the invention can be used with systems which are not voice activated, such as key-in activation systems. Accordingly, the audio playback facility of the present invention can have utility in such systems to help callers resolve ambiguations.

Figure 2:
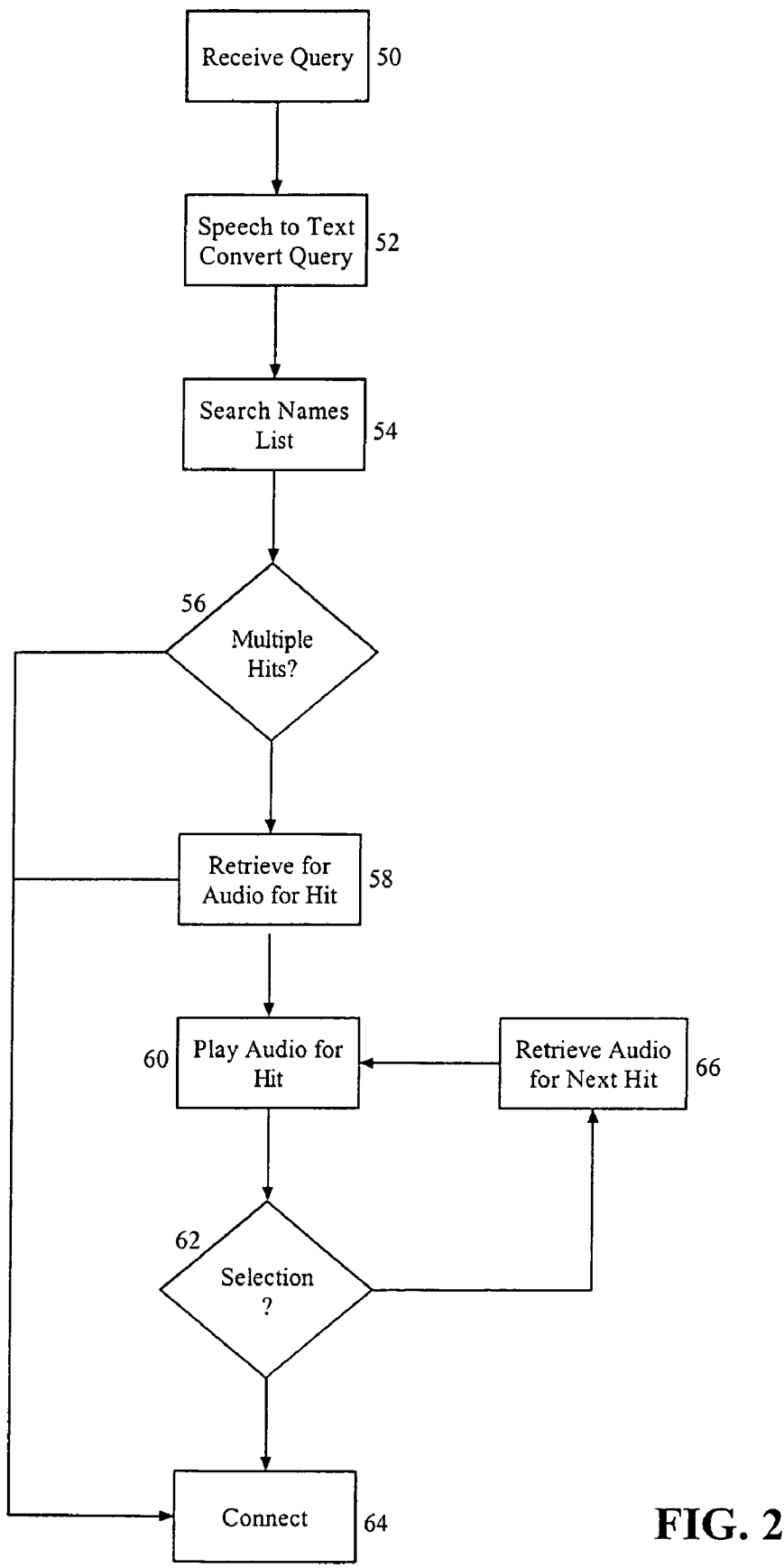
FIG. 2 is a flow chart illustrating a method according to the invention.

A method for resolving ambiguations in voice activated directory assistance systems is shown in FIG. 2. Beginning in step 50, a request is received from a caller. The request of the caller can be converted from speech to text in step 52. In step 54, the names list can be searched for the name spoken in step 50 and converted to computer-processable text in step 54. In step 56, if only a single hit is returned when searching the names list, in step 64, the caller can be connected to the particular person associated with the located name. By comparison, if multiple hits are returned when searching the names list, a disambiguation process can proceed.

Specifically, in step 58, audio information for a first located name can be retrieved. In step 60, the audio information corresponding to the first located name can be played for the caller. If the caller identifies the person, a selection can be made by the caller. Notably, the selection can be voice activated or key activated. If in step 62 a selection has been made, in step 64 the caller can be connected to the particular person associated with the selected name. Otherwise, in step 66, audio information corresponding to a next located name can be retrieved and the process can continue until a selection is made.

Notably, the present invention can be realized in hardware, software, or a combination of hardware and software. The method of the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which when loaded in a computer system is able to carry out these methods. Computer program means or computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

We claim:

1. A method for correcting ambiguations in directory assistance systems, comprising the steps of:
   receiving and processing a voice directory assistance request from a caller;
   performing speech recognition on the voice directory assistance request;
   presenting audio information to said caller if the request results in an ambiguation of at least two names, said audio information comprising a serial presentation of audibly recorded alternative names, each name audibly recorded in a voice of a person named; and
   receiving from said caller a selection of a name, thereby resolving said ambiguation.

2. The method of claim 1, wherein said audio information comprises the person stating their name.

3. The method of claim 1, wherein the audio information comprises a message from the person being named.

4. The method of claim 1, wherein the directory assistance systems comprise voice activated directory assistance systems.

5. The method of claim 1, wherein said audio information includes additional information for selecting between names in said ambiguation.

6. The method of claim 5, wherein said additional information comprises at least one of department information, location information, job description information, and personal information.

7. The method of claim 1, further comprising the step of connecting said caller to the phone line of the selected name.

8. A directory assistance system, comprising:
a searchable directory for storing directory information;
a database of audio recordings, each audio recording comprising a name of a person audibly recorded in a voice of a person named and corresponding to an entry in said searchable directory;
a query system for searching said directory for a particular entry based on received voice directory assistance requests;
a speech recognition system for converting the voice directory assistance requests into computer-processable queries for processing by said query system; and
a disambiguation system for retrieving and playing back selected ones of said audio recordings in said database responsive to said query system locating multiple entries during a directory search;
said disambiguation system serially presenting the selected audio recordings when multiples entries are located in response to a query from a caller seeking directory assistance to enable the caller to select a name.

9. The directory assistance system of claim 8, wherein each audio recording comprises a person stating their name.

10. The directory assistance system of claim 8, wherein said audio recordings comprise voice messages.

11. The directory assistance system of claim 8, wherein the directory assistance system is a voice activated directory assistance system.

12. The directory assistance system of claim 8, wherein said database of audio recordings further comprises additional information for selecting between names in an ambiguation.

13. The directory assistance system of claim 12, wherein said additional information comprises at least one of department information, location information, job description information, and personal information.

14. The directory assistance system of claim 8, further comprising structure for connecting a caller of the directory assistance system to a telephone associated with a located entry in said searchable directory.

15. A machine readable storage, having stored thereon a computer program for correcting ambiguations in a directory assistance system, said computer program having a plurality of code sections executable by a machine for causing the machine to perform the steps of:
receiving and processing a voice directory assistance request from a caller;
performing speech recognition on the voice directory assistance request;
presenting audio information to said caller if the request results in an ambiguation of at least two names, said audio information comprising a serial presentation of audibly recorded alternative names, each name audibly recorded in a voice of a person named; and
receiving from said caller a selection of a name, thereby resolving said ambiguation.

16. The machine readable storage of claim 15, wherein said audio information comprises the person stating their name.

17. The machine readable storage of claim 15, wherein the audio information comprises a message from the person being named.

18. The machine readable storage of claim 15, wherein the directory assistance system is a voice activated directory assistance system.

19. The machine readable storage of claim 15, wherein said audio information includes additional information for selecting between names in said ambiguation.

20. The machine readable storage of claim 19, wherein said additional information comprises at least one of department information, location information, job description information, and personal information.

21. The machine readable storage of claim 15, further comprising the step of connecting said caller to the phone line of the selected name.

\* \* \* \* \*